United States Patent [19]

Pickel

[11] 4,014,415
[45] Mar. 29, 1977

[54] ADJUSTING DEVICE FOR HYDRAULIC WORKING PISTONS
[75] Inventor: Hajo Pickel, Hachenburg, Germany
[73] Assignee: ITT Industries, Inc., New York, N.Y.
[22] Filed: Sept. 10, 1975
[21] Appl. No.: 612,063
[52] U.S. Cl. .............................. 188/196 D; 92/13.6; 92/33; 188/71.9
[51] Int. Cl.² ......................................... F16D 65/38
[58] Field of Search ................. 92/32, 33, 13.6, 17; 188/196 D, 71.9

[56] References Cited
UNITED STATES PATENTS

| | | | |
|---|---|---|---|
| 3,488,687 | 1/1970 | Farr | 188/196 D |
| 3,491,859 | 1/1970 | Farr | 188/196 D |
| 3,590,964 | 7/1971 | Krause | 188/71.9 |
| 3,592,299 | 7/1971 | Erdmann | 188/71.9 |
| 3,595,348 | 7/1971 | Kyllonen | 188/196 D |
| 3,620,133 | 11/1971 | Feucht | 92/33 |
| 3,809,189 | 5/1974 | Farr | 188/196 D |
| 3,885,653 | 5/1975 | Farr | 188/196 D |
| 3,900,085 | 8/1975 | Harrison | 188/196 D |

FOREIGN PATENTS OR APPLICATIONS 2,330,949  6/1972  Germany

*Primary Examiner*—Martin P. Schwadron
*Assistant Examiner*—Abraham Hershkovitz
*Attorney, Agent, or Firm*—John T. O'Halloran; Alfred C. Hill; Peter C. Van Der Sluys

[57] ABSTRACT

The adjusting device includes a threaded spindle onto which an adjusting nut is screwed, a frictional-engagement turning mechanism for the adjusting nut, a brake for preventing a turning movement of the adjusting nut and a resilient connection between the turning mechanism and the working piston. The brake is formed by two seal lips of a sealing arrangement stationarily connected with the working piston, the two seal lips abutting in a sealed relation against the adjusting nut and acting in opposite directions.

5 Claims, 1 Drawing Figure

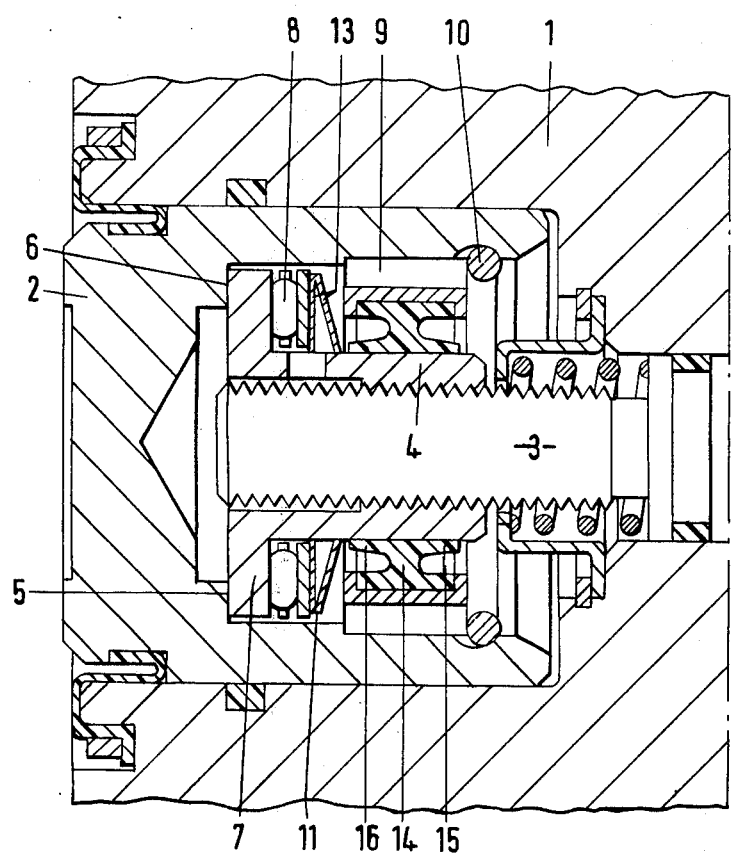

ADJUSTING DEVICE FOR HYDRAULIC WORKING PISTONS

BACKGROUND OF THE INVENTION

This invention relates to an automatic adjusting device for hydraulical working pistons, comprising a threaded spindle onto which an adjusting nut limiting the return movement of the working piston is screwed, a frictional-engagement turning mechanism for the adjusting nut, the operation of the turning mechanism is dependent on the stroke of the working piston, a brake for preventing a turning movement of the adjusting nut, the operation of the brake acting on the working piston is dependent on the hydraulic pressure, and a resilient connection between the turning mechanism and the working piston. Such an adjusting device is known from the German published patent application DT-OS 2,330,949.

It is an old problem of automatic adjusting devices that after the necessary lifting clearance has been overcome, the additional actuation stroke occurring due to pad wear is to be adjusted, but not the additional actuation stroke resulting from elastic elongations in the brake. The latter would prevent release of the brake after the brake actuating process in case the advantage of a small lifting clearance is not renounced. Therefore, the adjusting device must distinguish between a stroke of the working piston, which is to be adjusted, and a stroke which is not to be adjusted also after the lifting clearance has been overcome.

In adjusting devices wherein the turning mechanisms for the adjusting nut include an adjusting sleeve with a slanting slot (see e.g. German published patent application DT-OS 1,902,597), this difficulty can be solved in that the slot is designed in such a way that with a large stroke of the working piston, only a part of this stroke is adjusted. This design has the disadvantage that no constant lifting clearance can be maintained and that the lifting clearance becomes too small after repeated brake actuation, which might prevent a release of the brake in extreme cases.

The adjusting device according to the initially named German published patent application DT-OS 2,330,949 solves this problem by means of a friction brake which prevents the adjusting nut from turning above a certain hydraulic pressure and, thus, realizes a constant lifting clearance. But up to now, the friction brake could not prevail in practice because it is considerably more complicated in design relative to usual adjusting devices. Adjusting devices for hydraulically actuated disc brakes are necessary in case disc brakes shall be combined with a mechanical actuation. The high costs for the adjusting devices led among other considerations to the fact that drum brakes are provided for vehicles at the rear wheels, which drum brakes can be mechanically actuated without an adjusting device. The friction brake according to the German published patent application DT-OS 2,330,949 is formed such that the threaded spindle of the adjusting device has a coaxial bore in which a piston is sealably guided. This piston is actuated by the atmosphere pressure, on the one hand, and by the hydraulic pressure in the brake, on the other hand. The piston is prestressed by a strong spring in the direction towards the chamber in which the hydraulic pressure of the brake acts. The hydraulic pressure in the braking system effects a movement of the piston against the force of this spring. In this process, the piston shifts a radial detent moving into the thread of the adjusting nut of the adjusting device and preventing the adjusting nut from a further turning.

SUMMARY OF THE INVENTION

It is the object of the present invention to provide an adjusting device of the initially named type, which can be manufactured as simply and as cheaply as possible and which is not much more expensive than adjusting devices without a friction brake for limiting the maximum possible adjustment.

A feature of the present invention is the provision of an automatic adjusting device for a hydraulic working piston comprising: a threaded spindle; an adjusting nut threaded on the spindle to limit the return movement of the working piston; a frictional-engagement turning mechanism in association with the nut, the operation of the turning mechanism being dependent on the stroke of the working piston; a resilient connection between the turning mechanism and the working piston; and a brake associated with the nut to prevent a turning movement thereof, the operation of the brake being dependent on hydraulic pressure actuating the working piston, the brake including a sealing arrangement having two seal lips, the sealing arrangement being stationarily connected to the working piston and the seal lips abutting against the adjusting nut in a sealed relationship and acting in opposite directions.

The chamber between the seal lips of the sealing arrangement does not communicate with the atmosphere. For this reason, it is surprising that this sealing arrangement is in a position to exert a utilizable brake torque on the adjusting nut. But tests have shown that it produces a friction torque approximately proportional to the hydraulic pressure in the brake. A comparable sealing lip e.g. effects 0.15 kgf (kilogram-force) with a pressure of 10 bar, i.e. approximately half of the brake torque of a sealing sleeve sealing against the atmosphere. The linear rise of the friction torque has the advantage that in correspondence with the determined switching pressure, the necessary spring tension of the resilient connection between the turning mechanism and the working piston can be calculated precisely, and that the spring tension only varies within reasonable limits in accord with the tolerances. An exact coordination of the spring force with the friction force of the friction brake is necessary in order that a sufficient operational security of the areas in which the adjusting device is freely movable and self-locking is present and that the spring permits an axial movement of the working piston relative to the adjusting nut from the moment that the friction brake prevents the nut from turning.

The advantages of the present invention are in the main that a pressure-controlled brake for preventing a turning movement of the adjusting nut is provided with simplest means. Since the adjusting device does not adjust elongations in the braking system, the lifting clearance of the brake can be small. This in turn has the advantage that also the mechanic brake must only overcome a small lifting clearance, and that it can be provided with a large transmission ratio. Above all, this is important for disc brakes which require high actuation forces. Owing to the inventive adjusting device, an automotive vehicle braking system with disc brakes at all four wheels and mechanic hand-brake actuation at two wheels becomes insignificantly more expensive than the provision of two disc brakes, two drum brakes and hand-brake actuation of the drum brake. In turn, a higher functioning efficiency and increased comfort are gained with the braking system with disc brakes at all wheels.

BRIEF DESCRIPTION OF THE DRAWING

The above-mentioned and other features and objects of this invention and the manner of obtaining them will become more apparent by reference to the following description taken in conjunction with the drawing, the single FIGURE of which is a longitudinal cross-section of the adjusting device in accordance with the principles of the present invention.

DESCRIPTION OF THE PREFERRED EMBODIMENT

In a working cylinder 1, a working piston 2 is arranged axially shiftably for actuating the brake which is not shown. The inside of working piston 2 is hollow. A threaded spindle 3 with coarse threads projects into working piston 2. Threaded spindle 3 is secured against turning in a manner known to the expert, and rests against the lever of the mechanic actuation in a manner not shown.

An adjusting nut 4 is screwed onto threaded spindle 3. Adjusting nut 4 has a front end surface 5 which abuts against a surface 6 of working piston 2 when the brake is not actuated. Moreover, adjusting nut 4 has a collar 7 against which an axial needle bearing 8 is supported.

Inside working piston 2, a gear sleeve 9 is disposed which has a toothing on its outer periphery in order that the actuating fluid can pass therethrough and which is fastened in working piston 2 by means of a disengageable circlip 10. A resilient connection 11 which can be formed by two undulated washers 13 is provided between gear sleeve 9 and axial needle bearing 8.

To create a brake between working piston 2 and adjusting nut 4 for preventing a turning movement of the adjusting nut, the inventive adjusting device has a sealing arrangement 14 with two seal lips 15 and 16 abutting adjusting nut 4 in a sealed relationship. Instead of the sealing arrangement made of only one single seal, two single seals can naturally be provided one after the other, the seal lips of which are directed in opposite directions.

The described adjusting device works as follows. If the inside of working piston 2 is actuated by fluid, working piston 2 will start to move in the actuation direction, i.e. to the left as seen in the drawing. In this process, surface 6 of working piston 2 withdraws from end surface 5 of adjusting nut 4. Gear sleeve 9 moves to the left together with working piston 2 and acts on axial needle bearing 8 via resilient connection 11 having a certain prestress. Since threaded spindle 3 has coarse threads, adjusting nut 4 is turned until end surface 5 abuts against surface 6 of working piston 2 again. From this action the desired adjustment is provided. During the adjustment operation there is little or no resistance to movement of piston 2, since the threads of adjusting nut 4 and the threads of spindle 3 are separated from each other and enable movement of piston 2 by a pressure that is less than the predetermined pressure necessary for actuation of the adjusting nut brake provided by sealing arrangement 14.

When pressure is reduced and working piston 2 moves back, adjusting nut 4 cannot turn back in the reverse direction because end surface 5 abuts against surface 6 of working piston 2 and the latter is secured against turning in a known manner. The necessary lifting clearance of the brake comes about by clearance in the thread between adjusting nut 4 and threaded spindle 3.

The brake for preventing a turning movement of the adjusting nut, formed by sealing arrangement 14, to prevent a further adjustment when an adjustment is not necessary, works as follows. If inside working piston 2, a predetermined pressure has been built up. The predetermined pressure is greater than the pressure applied to piston 2 when an adjustment is necessary, since there is a resistance to movement of piston 2 for a further adjustment due to the threads of spindle 3 and nut 4 being in contact with each other with proper clearance adjustment which requires greater pressure on the inside of piston 2 to actuate piston 2 to the left in the drawing to overcome this resistance to movement. This predetermined pressure acts on seal lips 15 and 16 of the sealing arrangement to exert such a friction torque on adjusting nut 4 that the latter is prevented from a further turning. If nevertheless, working piston 2 further moves in the actuation direction, an axial force will be exerted on gear sleeve 9 which in turn exerts an axial force on sealing arrangement 14 due to sealing arrangement 14 being contained in gear sleeve 9. The axial force on gear sleeve 9 will compress resilient connection 11 between gear sleeve 9 and axial needle bearing 8. Thus, surface 6 of working piston 2 can withdraw from end surface 5 of the adjusting nut without a further adjustment taking place because adjusting nut 4 is prevented from turning by the brake provided by sealing arrangement 14 in spite of the axial force acting on sealing arrangement 14 through gear sleeve 9.

While I have described above the principles of my invention in connection with specific apparatus it is to be clearly understood that this description is made only by way of example and not as a limitation to the scope of my invention as set forth in the objects thereof and in the accompanying claims.

I claim:

1. An automatic adjusting device for a hydraulic working piston comprising:
  a threaded spindle;
  an adjusting nut threaded on said spindle to limit the return movement of said working piston;
  a frictional-engagement turning mechanism in association with said nut, the operation of said turning mechanism being dependent on the stroke of said working piston;
  a resilient connection between said turning mechanism and said working piston; and
  a brake associated with said nut to prevent a turning movement thereof, the operation of said brake being dependent on a predetermined hydraulic pressure actuating said working piston, said brake including
    a sealing arrangement having two seal lips extending in opposite directions with respect to each other, said sealing arrangement being stationarily connected to said working piston and said seal lips abutting against said adjusting nut in a sealed friction torque relationship in the presence of said predetermined hydraulic pressure;
  said sealing arrangement including a single seal having said seal lips sealed against said adjusting nut; and said single seal is disposed in a gear sleeve connected to said working piston by a disengageable circlip remote from said working piston.

2. A device according to claim 1, wherein
said resilient connection includes
a spring element disposed between said gear sleeve and a collar carried by said adjusting nut adjacent said working piston.

3. An automatic adjusting device for a hydraulic working piston comprising:
a threaded spindle;
an adjusting nut threaded on said spindle to limit the return movement of said working piston;
a frictional-engagement turning mechanism in association with said nut, the operation of said turning mechanism being dependent on the stroke of said working piston;
a resilient connection between said turning mechanism and said working piston; and
a brake associated with said nut to prevent a turning movement thereof, the operation of said brake being dependent on a predetermined hydraulic pressure actuating said working piston, said brake including
a sealing arrangement having two seal lips extending in opposite directions with respect to each other, said sealing arrangement being stationarily connected to said working piston and said seal lips abutting against said adjusting nut in a sealed friction torque relationship in the presence of said predetermined hydraulic pressure;
said sealing arrangement being disposed in a gear sleeve connected to said working piston by a disengageable circlip remote from said working piston.

4. A device according to claim 3, wherein
said resilient connection includes
a spring element disposed between said gear sleeve and a collar carried by said adjusting nut adjacent said working piston.

5. An automatic adjusting device for a hydraulic working piston comprising:
a threaded spindle;
an adjusting nut threaded on said spindle to limit the return movement of said working piston;
a frictional-engagement turning mechanism in association with said nut, the operation of said turning mechanism being dependent on the stroke of said working piston;
a resilient connection between said turning mechanism and said working piston; and
a brake associated with said nut to prevent a turning movement thereof, the operation of said brake being dependent on a predetermined hydraulic pressure actuating said working piston, said brake including
a sealing arrangement having two seal lips extending in opposite directions with respect to each other, said sealing arrangement being stationarily connected to said working piston and said seal lips abutting against said adjusting nut in a sealed friction torque relationship in the presence of said predetermined hydraulic pressure;
said resilient connection including
a spring element disposed between a gear sleeve connected to said working piston by a disengageable circlip remote from said working piston and a collar carried by said adjusting nut adjacent said working piston.

* * * * *